Patented Feb. 1, 1944

2,340,298

UNITED STATES PATENT OFFICE 2,340,298

PRIMER

Howard J. Billings, South Acton, Mass., assignor, by mesne assignments, to Industrial Tape Corporation, New Brunswick, N. J., a corporation of New Jersey No Drawing. Application January 2, 1941, Serial No. 372,885

6 Claims. (Cl. 117—76)

This invention relates to an improved primer for adhesive sheets and tapes which have a flexible backing or support of regenerated cellulose ("Cellophane") carrying on one surface thereof a normally tacky pressure-sensitive water-insoluble adhesive film or coating having rubber or rubber-like material as the principal constituent.

Adhesive sheets of this kind are now commonly available in the form of tapes wound into rolls, so that the pressure-sensitive adhesive coating with which one side of the tape has been faced is in contact with the uncoated back of the tape when the tape is rolled upon itself. Accordingly, it is of particular importance that the adhesive for such tapes be of such a nature, and be so anchored to the backing, that it will effectively resist any tendency to offset or be peeled or lifted from the backing, either in the course of unwinding or when in use,—and without sacrificing the property of firm adhesiveness or long life commonly termed good aging. Such a tape is disclosed in the U. S. Patent No. 2,156,380 in which there is described a transparent flexible adhesive sheet having a backing of a hydrophilic material such as regenerated cellulose, a hydrophilic adhesive coating of rubber and ester gum, and a primer consisting principally of reclaim rubber and wood rosin, the primer serving to bind the adhesive coating to the backing.

The present invention relates to this class of sheets or tapes generally, and in particular to a primer having superior properties as a binder or anchorage between rubber, or rubber-like base adhesive coatings and backing of regenerated cellulose.

Primers hitherto known and available are not fully satisfactory as binders between the adhesives and backing herein referred to because of insufficient anchorage to the backing and/or to the adhesive coating. It frequently happens that the adhesive and primer are both stripped or peeled from the backing—for example, when unwinding the product as a tape from a roll—due to the fact that the primer, although adhering adequately to the adhesive, has insufficient adhesion or anchorage to the backing. In other instances, the adhesive will strip from the backing and priming coat.

An important feature of the present invention is the improvement in anchorage between the primer and the backing of regenerated cellulose, and also between the primer and the adhesive coating, while the other advantages and desirable characteristics of the adhesive sheets and tapes of the type referred to herein are retained.

To accomplish this purpose, the present invention provides a primer composed of two principal constituents, substantially insoluble in each other, one having a particular affinity for regenerated cellulose, and the other for the adhesive, these constituents being dispersible in a common vehicle, and without adverse effect upon each other. These two constituents are respectively polyvinyl alcohol, and a dispersion of vulcanized rubber, or rubber-like material preferably in the form of vulcanized latex or a vulcanizing dispersion of latex. The term rubber as used in the specification and claims is intended to be used in its generic sense to include natural rubber, compounded rubber, latex, rubber substitutes, synthetic rubbers, and the like.

Polyvinyl alcohol may be prepared in accordance with U. S. Patent No. 1,672,156, and is available commercially in various degrees of water solubility and viscosity, depending principally upon the degree of polymerization. In carrying out the present invention, it is found more convenient to use the type of polyvinyl alcohol which is soluble in cold water and of lesser solubility in hot water, although other types can be used by suitably adjusting temperatures and concentrations in order to effect and retain solubility of the polyvinyl alcohol in the aqueous primer until it is applied to the backing.

The vulcanized latex or other dispersion of vulcanized rubber or rubber-like material is preferably introduced directly as such into the aqueous primer solution, but if desired unvulcanized latex may be used instead, with the addition of suitable vulcanization accelerators, so that the final primer coat after drying will contain vulcanized rubber, or rubber-like material.

The primer may be conveniently prepared in accordance with the following example, parts being by weight:

| | Parts |
|---|---|
| Polyvinyl alcohol, "PVA #491" (10% solids) | 60 |
| Vulcanized latex, "Vultex #V303" (60% solids) | 10 |

These constituents are stirred together, forming a thick pasty cream. It will be noted that in this example there are equal parts by weight of polyvinyl alcohol and latex, on the dry or solids content basis.

The relative amounts of polyvinyl alcohol and vulcanized rubber in the primer may vary within a fairly large range. For good results, however, satisfactory amounts have been found to be between about 30 parts polyvinyl alcohol to 70 parts rubber, and 70 parts polyvinyl alcohol to 30 parts rubber, parts being based on solids content. Lesser amounts of polyvinyl alcohol decrease the adhesion to the backing and lesser amounts of rubber decrease the adhesion to the coating.

The primer may be applied to the regenerated cellulose sheet or tape in any desired manner, as by means of a doctor blade. The applied film, which should be exceedingly thin, dries rapidly, even without the aid of heat, although it may be convenient to apply heat in order to hasten the processing.

After the primer has dried, the rubber base, usually rubber and ester gum, adhesive is spread in suitable thickness, preferably from a solution in a suitable solvent such as toluene or naphtha. The application may be made by a doctor blade or other suitable means. The solvent is allowed to dry out, either at room temperature or by the use of heat, and the products may then be cut, rolled, or otherwise made up into form suitable for the trade.

The action of the primer, as already indicated, is two-fold, the polyvinyl alcohol has a marked affinity for the regenerated cellulose, and bonds firmly thereto, while the vulcanized rubber component adheres strongly to the rubber base gum adhesive coating. The rubber and polyvinyl alcohol in the primer film are so intimately intermixed and closely bound to each other that there is no tendency for them to separate under conditions of storage or use.

Vulcanized latex, or other dispersion of vulcanized rubber, is preferable to unvulcanized latex or rubber in the primer, because of its peculiar resistance to any tendency of the adhesive coating to soften the primer.

Fillers, coloring agents, and other materials may be incorporated in making the primer, if desired, or even a quantity of the rubber base gum adhesive may be mixed with the primer ingredients to increase the affinity between the adhesive and primer. In the latter mixture it is preferable to emulsify the adhesive that is to be mixed with the primer, and this can be conveniently accomplished by stirring the adhesive content into the aqueous solution of the primer.

From the foregoing it will be apparent that there has been provided a primer having the desired characteristics of adhering to both the adhesive mass and the backing of a pressure-sensitive adhesive tape, that is, of providing an excellent anchorage, without detrimentally affecting the necessary and desirable characteristics of a good pressure-sensitive adhesive tape.

It will be obvious to those skilled in the art that minor variations in the details of composition may be made without departing from the spirit and scope of this invention as defined in the following claims.

I claim:

1. In a pressure sensitive adhesive tape having a hydrophilic regenerated cellulose backing and a hydrophobic rubber base pressure sensitive adhesive coating, an intermediate primer coating of film-like proportions between said backing and said adhesive coating, said primer coating comprising polyvinyl alcohol having an affinity for the hydrophilic cellulose backing in combination with a rubber derived from an aqueous dispersion, said rubber having an affinity for the hydrophobic rubber base adhesive coating.

2. In a pressure sensitive adhesive tape having a hydrophilic regenerated cellulose backing and a hydrophobic rubber base pressure sensitive adhesive coating, an intermediate primer coating of film-like proportions between said backing and said adhesive coating, said primer coating comprising polyvinyl alcohol having an affinity for the hydrophilic cellulose backing in combination with a vulcanized rubber derived from an aqueous dispersion, said rubber having an affinity for the hydrophobic rubber base adhesive coating.

3. In a pressure sensitive adhesive tape having a hydrophilic regenerated cellulose backing and a hydrophobic rubber base pressure sensitive adhesive coating, an intermediate primer surface coating of film-like proportions between said backing and said adhesive coating, said primer coating comprising 30—70% polyvinyl alcohol based on the solids content contained and having an affinity for the hydrophilic cellulose backing and a corresponding 70—30% rubber content made from an aqueous dispersion and based on the solids content and having an affinity for the hydrophobic adhesive coating.

4. In a pressure sensitive adhesive tape having a hydrophilic regenerated cellulose backing and a hydrophobic rubber base pressure sensitive adhesive coating, an interposed primer coating of film-like proportions comprising substantially 60 parts by weight of 10% polyvinyl alcohol having an affinity for the hydrophilic cellulose backing and substantially 10 parts by weight of a rubber made from an aqueous dispersion and based on the solids content, and having an affinity for the hydrophobic adhesive coating.

5. In a pressure sensitive adhesive tape having a hydrophilic regenerated cellulose backing and a hydrophobic rubber base pressure sensitive adhesive coating, an intermediate primer surface coating of film-like proportions comprising a mixture of equal parts on a dry solids basis of polyvinyl alcohol having an affinity for the hydrophilic cellulose backing and a rubber having an affinity for the hydrophobic adhesive coating and made from an aqueous dispersion of a rubber.

6. In a pressure sensitive adhesive tape having a flexible, nonfibrous, cellulosic, film-like hydrophilic backing, having a smooth, nonporous surface and a hydrophobic rubber base pressure sensitive adhesive coating, an intermediate primer coating of film-like proportions between said backing and said adhesive coating, said primer coating comprising polyvinyl alcohol having an affinity for the hydrophilic backing in combination with a bonding material of a rubber derived from an aqueous dispersion, said latter material having an affinity for the hydrophobic adhesive coating.

HOWARD J. BILLINGS.